(12) United States Patent
Kremer

(10) Patent No.: US 12,258,461 B2
(45) Date of Patent: Mar. 25, 2025

(54) BITUMEN PRODUCT

(71) Applicant: Omya International AG, Oftringen (CH)

(72) Inventor: Hartmut Kremer, Wernberg (AT)

(73) Assignee: Omya International AG, Oftringen (CH)

( * ) Notice: Subject to any disclaimer, the term of this patent is extended or adjusted under 35 U.S.C. 154(b) by 588 days.

(21) Appl. No.: 17/642,805

(22) PCT Filed: Sep. 23, 2020

(86) PCT No.: PCT/EP2020/076523
§ 371 (c)(1),
(2) Date: Mar. 14, 2022

(87) PCT Pub. No.: WO2021/058535
PCT Pub. Date: Apr. 1, 2021

(65) Prior Publication Data
US 2022/0380569 A1     Dec. 1, 2022

(30) Foreign Application Priority Data
Sep. 23, 2019 (EP) .................................... 19199058

(51) Int. Cl.
*C08K 3/013*     (2018.01)
*C08K 7/24*      (2006.01)

(52) U.S. Cl.
CPC ............. *C08K 3/013* (2018.01); *C08K 7/24* (2013.01); *C08K 2201/005* (2013.01)

(58) Field of Classification Search
CPC .... C08K 3/013; C08K 7/24; C08K 2201/005; C04B 20/002; C04B 20/066; C04B 20/1003; C04B 26/26; C04B 14/185
See application file for complete search history.

(56) References Cited

U.S. PATENT DOCUMENTS

| | | | | |
|---|---|---|---|---|
| 2,542,721 | A | * | 2/1951 | Stafford ............... C09D 195/00 |
| | | | | 250/214 D |
| 3,373,074 | A | * | 3/1968 | Eustach .............. E04D 13/1668 |
| | | | | 428/313.9 |
| 4,168,178 | A | * | 9/1979 | Hesseler .................. C08K 3/04 |
| | | | | 106/282 |
| 4,168,179 | A | | 9/1979 | Hesseler |

(Continued)

FOREIGN PATENT DOCUMENTS

| | | |
|---|---|---|
| CH | 483534 | 12/1969 |
| DE | 2049248 | 4/1972 |

(Continued)

OTHER PUBLICATIONS

MT WO 2012047012A2 (Year: 2012).*

(Continued)

*Primary Examiner* — Pamela H Weiss
(74) *Attorney, Agent, or Firm* — GREENBLUM & BERNSTEIN, P.L.C.

(57) ABSTRACT

A bitumen product including bitumen and a mineral filler. In order to reduce the specific weight of the bitumen product while allowing sufficient scaling effect, the mineral filler contains expanded perlite grains, the expanded perlite grains having a closed-cell surface, and the expanded perlite grains having a closed-cell surface are not ground.

7 Claims, 1 Drawing Sheet

(56) References Cited

U.S. PATENT DOCUMENTS

| | | | |
|---|---|---|---|
| 5,002,696 | A | 3/1991 | White |
| 9,011,708 | B2 * | 4/2015 | Baek .................. B28B 23/0087 252/62 |
| 2014/0291582 | A1 | 10/2014 | Brunnmair |
| 2016/0244375 | A1 * | 8/2016 | Maier ..................... C04B 26/02 |
| 2019/0118244 | A1 * | 4/2019 | Lehmann ............ C04B 35/6303 |
| 2020/0277228 | A1 | 9/2020 | Gaus |
| 2022/0340489 | A1 | 10/2022 | Kremer et al. |

FOREIGN PATENT DOCUMENTS

| | | |
|---|---|---|
| DE | 10 2017 119 371 | 2/2019 |
| EP | 0 353 860 | 2/1990 |
| EP | 2 647 607 | 10/2013 |
| JP | 08041284 A * | 2/1996 |
| SU | 1270146 | 11/1986 |
| SU | 1767277 A1 | 10/1992 |
| WO | WO-2012047012 A2 * | 4/2012 ............ C08J 9/0066 |
| WO | 2013/053635 | 4/2013 |
| WO | 2017/174826 | 10/2017 |

OTHER PUBLICATIONS

English Abstract JP 08041284A (Year: 1996).*
Office Action issued Nov. 29, 2022 in Russian Application No. 2021108092, with English translation thereof.
Office Action (Notice of Allowance) issued May 29, 2022 in Israel Application No. 282884.
International Search Report issued in PCT/EP2020/076523, Dec. 21, 2020, English translation.
Written Opinion of the International Searching Authority issued in PCT/EP2020/076523, Dec. 21, 2020, English Translation.
Office Action issued Mar. 24, 2023 in Canadian Application No. 3,154,936.
Office Action issued Jun. 30, 2022 in Russian Application No. 2021108092, English translation.

* cited by examiner

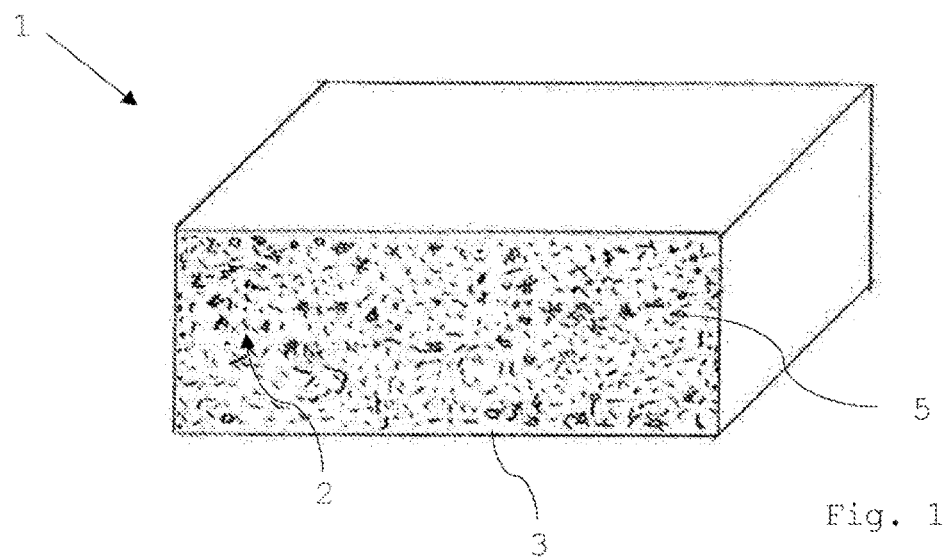
Fig. 1
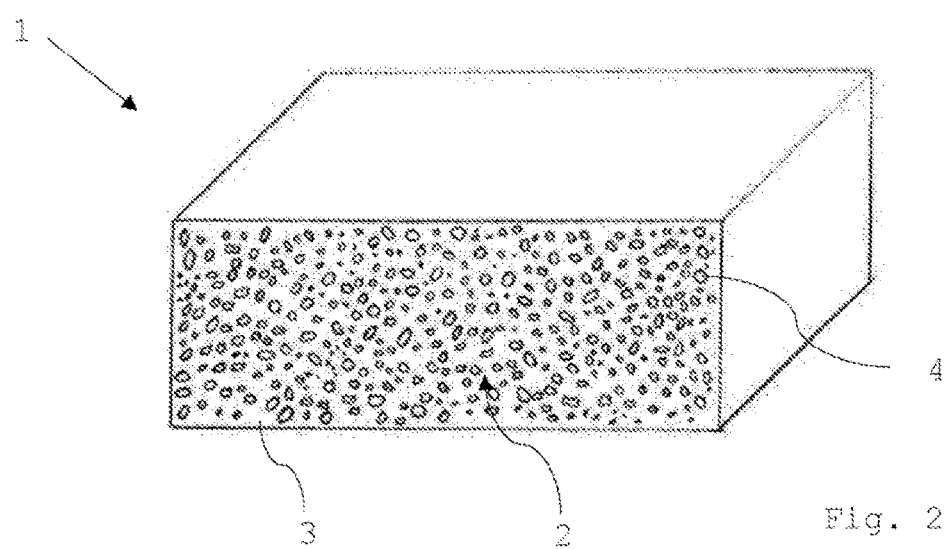
Fig. 2
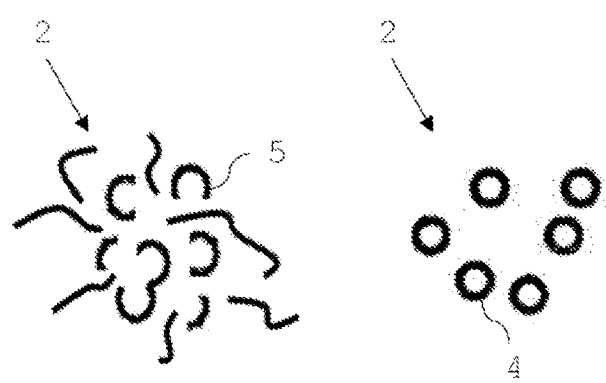 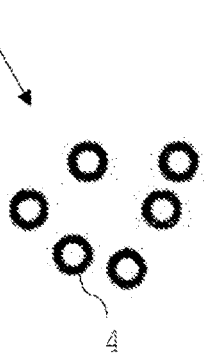
Fig. 3    Fig. 4

BITUMEN PRODUCT

FIELD OF THE INVENTION

The invention relates to a bitumen product comprising bitumen and a mineral filler.

STATE OF THE ART are dark-colored, high-molecular hydrocarbon mixtures in the form of a tar-like mass obtained during the gentle processing of petroleum. The material properties of bitumen permit a wide range of applications in the construction industry. In building construction products are used, for example, to protect parts of buildings against moisture. On the one hand, bituminous membranes are used, e.g. bituminous felt as roof waterproofing. On the other hand, bituminous masses are used for the exterior waterproofing of buildings, especially basements, which are processed in a viscous state. Typically, they are also used in road and airport construction as well as in house and apartment construction, but also, for example, as a noise-absorbing and damage-inhibiting protective coating for automobiles.

In general, the bitumen products of interest here consist of a base compound of bitumen plus other fillers and additives. While asbestos was very often used as a filler in the past, it has been replaced by other fillers, such as expanded perlite, due to its carcinogenic properties.

The term expanded perlite in this context is also understood to be volcanic glass and other rock, which has the property of expanding more or less strongly and more or less suddenly when heated. Perlite is therefore a mineral filler which becomes plastic when heated to a critical temperature, whereby the water bound in the perlite, the so-called water of crystallization, evaporates and thus acts as a blowing agent. The evaporation process is accompanied by the inflation of the perlite to a multiple of its original volume.

The filler is added to the base compound to improve the properties of the bitumen product. By the addition of the filler the permanent stability—i.e. the strength, durability as well as the shrinkage property of the bitumen product—is positively influenced. In addition, the softening point of the bitumen product is also increased.

The use of expanded perlite as filler is particularly economical, as it is readily available and cost-effective. However, due to its low mechanical strength, expanded perlite has so far only been used in bitumen products in ground or pulverized form. Grinding or pulverization takes place either during the manufacturing process, as a result of the mixing with the base compound of bitumen and the other fillers and additives and thus quasi as an unavoidable consequence of mixing or as a separate process step already before mixing. In this context, one also speaks of "crushed perlite".

Such bitumen products are known, for example, from the U.S. Pat. Nos. 4,168,178 A and 4,168,179 A, where perlite is used as an asbestos substitute. The problem is that by grinding or pulverizing the expanded perlite, the density of the resulting filler is unnecessarily increased compared to the non-ground or pulverized expanded perlite, whereby the specific gravity of the bitumen product is also increased.

Moreover, the crushed or pulverized expanded perlite with its irregular shape influences the rheological behavior of the bitumen product during production and processing unfavorably.

Problem of the Invention

The present invention is therefore based on the problem of providing a bitumen product which overcomes the afore- mentioned disadvantages of the prior art. In particular, the bitumen product should have a low specific weight and still achieve sufficient sealing effect.

Presentation of the Invention

This task is solved in a bitumen product comprising bitumen and a mineral filler, in that the mineral filler comprises expanded perlite grains, which expanded perlite grains have a closed-cell surface, wherein the expanded perlite grains with closed-cell surface are unground.

In the context of the invention, expanded perlite grains with a closed-cell surface due to the formation of water vapor or due to another blowing agent are understood to mean expanded perlite grains, whose surface exhibits no or hardly any edges, ridges or irregularities (in particular no surfaces perpendicular to the surface). Compared to conventional, expanded perlite grains with an open-cell surface, this not only improves the rheological properties of the bitumen product according to the invention, but also the density of the filler and thus of the bitumen product according to the invention is reduced. Furthermore, a closed-cell surface is accompanied by good mechanical properties.

In the case of the expanded, closed-cell perlite grains, which are ideally spherical in shape, but can also be egg-shaped or potato-shaped, they are thus a type of hollow perlite body. The distended, closed-cell perlite grains are characterized by the fact that a volume or a plurality of volumes is or are ideally completely enclosed by a surface area, the surface area being largely minimal in relation to the volume or the sum of the enclosed volumes.

It should not go unmentioned at this point that, in the sense of the present invention, a distended perlite grain is still considered to be closed-cell even if the surface has burst open in a few, minor places. When speaking of bursting of the surface in this context, it should be noted that, in the sense of the invention, a surface of an expanded perlite grain is then not considered to be burst open and thus closed-celled if less than 15%, preferably less than 10%, particularly preferably less than 5%, of the surface of the expanded perlite grains is burst open and the remaining surface is smooth. It must be taken into account that such "defects" do not cause or allow the entire perlite void to fill; rather, only one cell of the perlite grain directly affected by the "defect" is no longer intact, the remaining voids are intact and do not or cannot fill.

In practice, the ratio of particle density to bulk density can be used to distinguish between perlite grains with an open-cell surface and perlite grains with a closed-cell surface.

Particle density in this context means the density of the expanded perlite grains without a void volume between the expanded perlite grains. To determine the particle density, a defined volume is filled with inflated perlite grains. The voids created in the defined volume between the expanded perlite grains are then filled with a fluid, e.g. helium, in a controlled manner.

In order to obtain the particle density, the void volume filled with the fluid in a controlled manner is subtracted from the defined volume.

I.e. the particle density is the ratio of the weight of the expanded perlite grains to a particle volume corresponding to the defined volume minus the void volume.

The bulk density, in turn, is the ratio of the weight of the expanded perlite grains to the defined volume including the void volume. In the case of industrially manufactured hollow glass spheres (microspheres), which are, however, only commercially available in a very limited size and density range, the ratio of particle density to bulk density, for example, is about 1.5:1. For perlite grains with closed-cell surfaces, this ratio is less than 2.0:1, preferably less than 1.7:1, particularly preferably less than 1.6:1. In comparison, for perlite grains with open-cell surfaces, this ratio is greater than 3.0:1.

Expanded perlite grains with a closed-cell surface have proven to be so stable that, if suitable strength is selected, their surface remains largely undamaged when processed as a lightweight filler in a bitumen product i.e. it occurs during processing in bitumen products virtually no pulverizing or grinding of the surface of the expanded perlite grains.

In addition, the use of the expanded perlite grains with closed-cell surface as a lightweight filler creates or increases a volume of voids in the bitumen product of the invention, thereby significantly reducing the specific gravity of the bitumen product of the invention. With the reduction of the specific weight or the density, simultaneously a high thermal insulation effect is achieved.

In addition, the coefficient of expansion is reduced, which favors the maintenance of the sealing function, i.e. the basic function of the bitumen product as a sealant, in the event of fluctuating outside temperatures.

The bitumen product according to the invention can, of course, also contain additives, whereby its properties can be optimally adapted to the respective application. For example, the bitumen product according to the invention can additionally contain rheological additives.

It is conceivable that the bitumen product could also have a or more polymeric plastics, e.g. thermoplastics such as polyethylene (PE), polypropylene (PP) or polyvinyl chloride (PVC), wherein the polymeric plastics increase a plasticity range and ensure resistance to chemical influences.

It would also be conceivable for the bitumen product of the invention to comprise one or more elastomeric plastics, such as polyurethane (PU) or styrene-butadiene-styrene (SBS). The addition of elastomeric plastics enables the bitumen product of the invention to be soft and elastic.

With suitable selection of the density and thus the mechanical strength of closed-cell expanded perlite grains, the majority of closed-cell expanded perlite grains have virtually no surface grinding or crushing during production, processing and application or use of the bitumen product. By majority is meant in this context, it is understood that more than 80%, preferably more than 90%, particularly preferably more than 95%, of the closed-cell expanded perlite grains are unground. Therefore, according to the invention, it is provided that the expanded perlite grains with closed-cell surface are unground.

This ensures that the bitumen product according to the invention has good rheological properties and a low density. Ideally, a bitumen product according to the invention comprises exclusively closed-cell expanded perlite grains as the mineral lightweight filler. However, it is not excluded that the bitumen product also comprises other fillers. In an alternative embodiment of the invention, it is therefore provided that the bitumen product also comprises a mineral filler in the form of open-celled expanded perlite grains. I.e. the mineral filler comprises both expanded perlite grains with closed-cell surface and expanded perlite grains with open-cell surface. This has the advantage that the expanded perlite grains with open-cell surface can interlock between the expanded perlite grains with closed-cell surface, causing the expanded perlite grains to support each other. As a result the strength properties of the bitumen product according to the invention can be improved.

In addition, this still gives sufficient weight to products with exclusively open-cell expanded perlite grains as a lightweight filler, so that more costly closed-cell expanded perlite grains do not have to be used exclusively as lightweight fillers.

In another embodiment of the invention is provided that a proportion of expanded perlite grains with closed-cell surface in wt. % is greater than a proportion of expanded perlite grains with open-cell surface. That is, the bitumen product according to the invention has a mineral filler which, by weight, has a higher proportion of expanded perlite grains with a closed-cell surface than of expanded perlite grains with an open-cell surface. This ensures that the bitumen product according to the invention has a low specific weight and can be produced cost-efficiently.

In a further embodiment of the invention, it is provided that the expanded perlite grains with closed-cell surface have a bulk density of between 90 kg/m3 and 550 kg/m3, preferably of between 200 kg/m3 and 380 kg/m3.

It would be conceivable, for example, that the bulk density of the expanded perlite grains with closed-cell surface of the bitumen product according to the invention is selected just low enough so that a sealing function through the production process and in subsequent use is just not impaired and the corresponding just permissible weight saving is achieved. In this way, one unit of weight of the bitumen product according to the invention can be used to achieve more sealing volume without increasing a force for a transport to a place of application. At the same time, the load-bearing capacity of a body, in particular a structure or automobile, is reduced, resulting in lighter supporting structures is made possible. This makes the use of the bitumen product according to the invention more economical.

In another embodiment of the invention, it is provided that the expanded perlite grains with closed-cell surface have a particle size of between 5 μm and 2000 μm, preferably between 25 μm and 1200 μm, particularly preferably between 50 μm and 600 μm. The particle size is understood to be a shortest distance within the grain interior of a perlite grain between those two points of the surface of the perlite grain which are points on the farthest from each other. I.e. the Particle size can be determined independently of the surface shape of the perlite grains.

A smaller particle size leads to a higher viscosity of the bitumen product according to the invention, since—a constant volume fraction provided—the number of perlite grains increases, which increases interactions between the perlite grains. A larger particle size in turn leads to a lower viscosity of the bitumen product of the invention, since the interactions between the perlite grains decrease. I.e. the rheological properties can be adjusted by the particle size depending on the desired properties of the bitumen product according to the invention.

In one embodiment of the invention, it is provided, that the expanded perlite grains are present in the bitumen product of the invention in amounts of between 1% and 20% by weight, preferably in amounts of between 2% and 12% by weight.

In another embodiment of the invention, it is provided that the bitumen is present in amounts of between 75 wt. % and 85 wt. %. An amount of between 75 wt. % and 85 wt. % is optimally suited for the absorption of the distended perlite grains with closed-cell surface.

The task described at the beginning is therefore also solved by a bitumen product comprising bitumen and a mineral filler with a bound blowing agent, which mineral filler comprises expanded, unground perlite granules wherein the mineral filler is obtainable by a process in which the perlite grains are introduce into a feed opening at one end of a furnace shaft, in a conveying direction along a heat treatment section, preferably by gravity, during conveying through the heat treatment section heated to a critical temperature at which the perlite grains become plastic and, due to the blowing agent begin to bloat;

after heating to the critical temperature, be heated to a second temperature above the critical temperature, which second temperature is below a third temperature, at which third temperature the surface of the perlite grains bursts, and wherein the second temperature is selected as a function of a desired density of the expanded perlite grains, and the expanded perlite grains are discharged at another end of the furnace shaft.

It has been found that, contrary to what is known and assumed in the prior art, a temperature range exists above the critical temperature within which the expansion of the perlite grains can be controlled by selection of a second temperature to which the perlite grains are heated in defined limits without causing the surface of the expanded perlite grains to burst.

If surface bursting is mentioned in this context, then—as already mentioned above—it is noted that, for the purposes of the invention, a surface of an expanded perlite grain is not considered to be burst and thus closed-celled if less than 15%, preferably less than 10%, more preferably less than 5%, of the surface of the expanded perlite grain is burst, and the remaining surface is smooth.

As has also been shown, the controlled expansion of the perlite grains makes it possible to adjust the density (kg/m3) or an expansion factor of the expanded perlite grains for fields of application relevant in practice. With other words, by appropriate selection of the second temperature, expanded perlite grains with different densities and thus different strengths can be produced, all of which nevertheless have closed surfaces and thus enclose the desired void volume.

The term swelling factor is understood to mean the ratio of the volume of the perlite grains before the swelling process to the volume of the perlite grains after the swelling process. The "closer" the second temperature is to the critical temperature, the "less" the perlite grains are expanded, i.e. the smaller is the blowing factor of the perlite grains. In this case, part of the blowing agent is not used for the expansion process, but this part remains in bound form in the expanded perlite grains. When the second temperature is increased, the blowing factor of the perlite grains also increases. The "closer the second temperature is at the third temperature, the more blowing agent is available for the blowing process—i.e. the less blowing agent remains in the perlite grains in bound form. That is, the choice of the second temperature controls the blowing process, which allows the density of the blown perlite grains to be specifically adjusted. The lower the second temperature is selected, the higher is the density of the expanded perlite grains. The higher the second temperature is selected, the lower is the density of the expanded perlite grains. Since the mechanical strength is directly proportional to the density of the closed-cell expanded perlite grains, at lower density of the expanded perlite grains, the mechanical strength of the expanded perlite grains is also lower, while at higher density of the expanded perlite grains, the mechanical strength of the expanded perlite grains is higher. Thus, the expanded perlite grains are versatile and can be used with the help of the process can be adapted to the respective application in such a way that the solution is particularly efficient.

The procedure is as follows:

During transport through the heat treatment section, the perlite grains are first heated to the critical temperature and then heated to the second temperature. From the critical temperature, the perlite grains, which each have a microstructure and a surface, become plastic. In other words, from the critical temperature onwards, the microstructure and the surfaces of the perlite grains in particular become plastic—i.e. the perlite grains become soft.

Due to the blowing agent, the majority of the perlite grains start to expand. By majority it is understood in this context that more than 80%, preferably 90%, particularly preferably 95%, of the applied perlite grains begin to bloat.

Since not all feed perlite grains have the same physical and chemical characteristics, it cannot be completely avoided that, for a certain number of perlite grains, plasticization and thus the blowing process starts later than with the majority of perlite grains. For this reason, it is advantageous if the feed perlite grains have as identical properties as possible, so that the heating of the perlite grains when carrying out the process according to the invention causes the same behavior in all perlite grains, or at least in the majority of perlite grains.

The second temperature lies in a range between the critical temperature and the third temperature, whereby the surface of the perlite grains bursts open at the third temperature. In the range between the critical temperature and the third temperature, the perlite grains expand as far as possible without bursting.

The structure and surfaces of the perlite grains have a temperature-dependent viscosity. At higher temperatures, the surfaces and the microstructure of the perlite grains are less viscous, which is why the perlite grains are more inflated by the evaporated blowing agent. Below the critical temperature, the viscosity is so high that the microstructure and the surfaces of the perlite grains do not become plastic and no swelling occurs. Above the third temperature, the viscosity of the structure and the surfaces of the perlite grains is again so low that, on the other hand, the evaporation pressure of the blowing agent is so high that the surfaces of the perlite grains burst open during the expansion process. This means that the viscosity, the expansion process and, subsequently, the density and mechanical strength of the expanded perlite grains are determined by the temperature set.

As already stated above, it has been found that the level of the second temperature causes a blowing factor or a density of the expanded granulate is selectively adjustable and in such a way that the level of the second temperature is inversely proportional to the density of the expanded granules, i.e. the lower the second temperature is selected, the higher is the density of the expanded granules and vice versa. As already written above, density is proportional to mechanical strength. Thus, at lower density of the expanded granules, the mechanical strength of the expanded granules is also lower, while at higher density of the expanded granules, the mechanical strength of the expanded granules is higher. For any practical application of the expanded granules, therefore, the strength can always be selected at which the mechanical strength is just sufficient.

It would be conceivable that in the process it is envisaged that the perlite grains, after being placed in the furnace shaft, are first preheated to a preheating temperature below the critical temperature in preparation for the blowing process, preferably to 750° C. at the most.

Depending on the starting material in the form of perlite grains, it is not necessary that the 750° C. are actually reached during preheating. It is only essential that the 750° C. are not exceeded, although, depending on the grain size of the starting material, the temperature can also be significantly lower than 750° C. Thus, the preheating temperature can for example also lie in the range between 500° C. and 650° C.

Preheating is used to slowly heat the perlite grains to an internal temperature before the blowing process. By heating up to the preheating temperature, all layers of the perlite grains—starting from a surface to a core—are heated slowly and not in a shock-like manner.

The aim is to ensure that the preheating process results in as uniform a temperature profile as possible within the layers of the perlite grains. By limiting the preheating temperature, it is prevented that, in case of too rapid heating up to the critical temperature, outer layers close to the surface are already swelling and an insulation layer before the core is heated. Furthermore, the limitation of the preheating temperature serves to prevent the blowing agent from developing so much pressure that the perlite grains expand uncontrollably, causing the surface to burst open. With the help of the process, it is possible to closed-cell expanded perlite grains with specifically adjusted density can be produced, whereby the bitumen product according to the invention can be optimally adapted to different production processes and fields of application. Expanded perlite grains produced in this way with closed-cell surface have a stability that allows largely undamaged processing as a filler in a bitumen product, i.e. during processing in bitumen products there is virtually no grinding or crushing of the surface of the expanded perlite grains—i.e. the expanded closed-cell perlite grains (with bound water) acting as mineral filler with bound blowing agent are unground—wherein the advantageous formation of voids in the bitumen product already described above is made possible and the advantages also described above arise.

SHORT DESCRIPTION OF THE FIGURES

The invention will now be explained in more detail by means of examples of embodiments. The drawings are exemplary and are intended to illustrate the idea of the invention, but by no means to restrict it or even to reproduce it conclusively.

Thereby shows:

FIG. 1 a schematic sectional view of a prior art bitumen product,

FIG. 2 a schematic sectional view of a bitumen product according to the invention, FIG. 3 a schematic representation of expanded perlite grains with an open-cell surface according to the prior art, and FIG. 4 a schematic representation of expanded perlite grains in spherical form with closed-cell surface.

WAYS OF CARRYING OUT THE INVENTION

FIG. 1 shows a cross-section through a bitumen product 1 according to the prior art. This can be, for example a bitumen board or a bitumen compound. The bitumen product 1 comprises a base compound of bitumen 3 and a lightweight filler of expanded perlite grains 2 with an open-cell surface 5. Further fillers and additives, which may also be present in the bitumen product are not shown for the sake of clarity.

Due to their low mechanical strength, the perlite grains 2 are only available in ground or pulverized form. The grinding or pulverization already takes place during the manufacturing process of the bitumen product 1, as a consequence of mixing the perlite grains 2 with the bitumen 3. Alternatively, it is also common in the prior art to grind or pulverize the expanded perlite in a separate process step prior to mixing in order to achieve a specific grain size in the bitumen product. The bitumen product 1 according to the prior art thus has perlite grains 2 with an open-cell surface 5 or a surface enclosing no cavity at all, whereby the bitumen product 1 due to the irregular shape of the pulverized or ground perlite 2 has unfavorable rheological properties. Moreover, the enclosed void volume is comparatively low.

FIG. 2 shows a cross-section through a bitumen product 1 according to the invention, which is also a bitumen board or a bitumen compound with a base of bitumen 3 and expanded perlite grains 2 with closed-cell surface 4. Further fillers and additives, which may also be present in the bitumen product, are not shown for the sake of clarity.

The expanded perlite grains 2 with closed-cell surface 4, having a bulk density of between 90 kg/m$^2$ and 550 kg/m$^3$, preferably of between 200 kg/m$^3$ and 380 kg/m$^3$, and a particle size of between 5 μm and 2000 μm, preferably of between 25 μm and 1200 μm, particularly preferably of between 50 μm and 600 μm, are present in an amount of from 1 wt. % to 20 wt. %, preferably in an amount of from 2 wt. % to 12 wt. %, in the bitumen product 1 according to the invention, while the amount of bitumen base 3 is in the range of between 75 wt. % and 85 wt. %.

This embodiment example represents an ideal state, since the bitumen product 1 according to the invention comprises exclusively perlite grains 2 with closed-cell surface 4 as filler.

Of course, this embodiment example is not intended to rule out that the bitumen product according to the invention in alternative embodiments not shown, in addition to the perlite grains 2 with closed-cell surface 4, also includes perlite grains 2 with open-cell surface 5, wherein it would be conceivable that the bitumen product 1 according to the invention comprises by weight more expanded perlite grains 2 with closed-cell surface 4 than expanded perlite grains 2 with open-cell surface 5.

Although—if the density of the closed-cell 4 expanded perlite 2 is chosen correctly—the stability and strength of the closed-cell 4 expanded perlite 2 allows it not to be pulverized or ground during the manufacturing process of the bitumen product 1 according to the invention, this cannot be completely excluded. Only if, if the majority—i.e. more than 80%, preferably more than 90%, particularly preferably more than 95%—of the expanded perlite grains 2 is unground it is guaranteed, that the bitumen product 1 according to the invention has good rheological properties as well as a low density.

Due to the possibility of specifically adjusting the density of the closed-cell 4 expanded perlite grains 2 within the practical limits, in this embodiment example—depending on the production process and/or intended use of the bitumen product 1 according to the invention—the density of the closed-cell 4 expanded perlite grains 2 is selected for economic reasons in such a way that a maximum of 5 vol. % to 10 vol. % of the closed-cell 4 expanded perlite grains 2 are destroyed in the course of the manufacturing process— choosing a higher density of closed-cell 4 expanded perlite grains 2 would be uneconomical because the cost is proportional to the density.

FIG. 4 shows a schematic view of expanded perlite grains 2 with closed-cell surface 4 of the bitumen product 1 according to the invention, which expanded perlite grains 2 do not have any irregularities.

In comparison, FIG. 3 is a schematic representation of expanded perlite grains 2 with an open-cell surface 5.

The bitumen product 1 according to the invention has numerous positive properties, such as lower specific gravity, better rheological properties, a better insulating effect, lower thermal expansion and a lower softening point. However, it is considered particularly essential that the schematic shapes shown in FIG. 4 are essentially retained during the production of the bitumen product 1 according to the invention, and the surfaces of the closed-cell 4 expanded perlite grains 2 do not break up.

REFERENCE LIST 1 bitumen product
2 perlite grains
3 bitumen
4 closed-cell surface
5 open-cell surface

The invention claimed is:

1. A bitumen product comprising bitumen as well as a mineral filler, wherein the mineral filler comprises expanded perlite grains, which expanded perlite grains have a closed-cell surface, and expanded perlite grains, which expanded perlite grains have an open-cell surface,
wherein a proportion of expanded perlite grains having a closed-cell surface is greater in % by weight than a proportion of expanded perlite grains having an open-cell surface,
wherein the expanded perlite grains with closed-cell surface are unground,
wherein the expanded perlite grains with closed-cell surface have a bulk density of between 90 kg/m³ and 550 kg/m³,
wherein the expanded perlite grains with closed-cell surface have a particle size of between 5 μm and 2000 μm, and
wherein the expanded perlite grains with closed-cell surface are present in amounts of between 1 wt. % and 20 wt. %.

2. The bitumen product according to claim 1, wherein the expanded perlite grains with closed-cell surface have a bulk density of between 200 kg/m³ and 380 kg/m³.

3. The bitumen product according to claim 1, wherein the expanded perlite grains with closed-cell surface have a particle size of between 25 μm and 1200 μm.

4. The bitumen product according to claim 1, wherein the expanded perlite grains with closed-cell surface are present in amounts of between 2 wt. % and 12 wt. %.

5. The bitumen product according to claim 1, wherein the bitumen is present in amounts of between 75% and 85% by weight.

6. A bitumen product according to claim 1 comprising bitumen and a mineral filler with a bound blowing agent, which mineral filler comprises expanded, unground perlite grains, wherein the mineral filler being obtainable by a process in which the perlite grains are
brought into a feed opening at one end of a furnace shaft,
transported in a conveying direction along a heat treatment line,
during transport through the heat treatment section heated to a critical temperature at which the perlite grains become plastic and start to expand due to the blowing agent,
after heating to the critical temperature heated to a second temperature above the critical temperature, which second temperature is below a third temperature, at which third temperature the surface of the perlite grains bursts open, and wherein the second temperature is selected dependent on a density of the expanded perlite grains,
and the expanded perlite grains are discharged at another end of the furnace shaft.

7. The bitumen product according to claim 1, wherein the expanded perlite grains with closed-cell surface have a particle size of between 50 μm and 600 μm.

* * * * *